United States Patent [19]

Siver

[11] Patent Number: 4,597,560
[45] Date of Patent: Jul. 1, 1986

[54] HALF-TURN VALVE
[75] Inventor: Chester A. Siver, Suffield, Conn.
[73] Assignee: Conval, Inc., Somers, Conn.
[21] Appl. No.: 779,074
[22] Filed: Sep. 23, 1985
[51] Int. Cl.⁴ ............................................. F16K 25/00
[52] U.S. Cl. ................................... 251/163; 251/161; 251/188
[58] Field of Search ................ 251/161, 162, 163, 188

[56] References Cited

U.S. PATENT DOCUMENTS

| | | | |
|---|---|---|---|
| 912,890 | 2/1909 | Roberts | 251/163 |
| 2,711,302 | 6/1955 | McWhorter | 251/163 |
| 4,231,440 | 11/1980 | Erwin | 251/163 X |
| 4,450,732 | 5/1984 | Lew | 251/162 X |

Primary Examiner—Harold W. Weakley

[57] ABSTRACT

A plug valve assembly employs a stem having a threaded end, and a shiftable locking key to alternatively interengage the plug with either the stem or the bonnet. When the plug is locked to the bonnet by the key, the threaded part of the shaft will initially lift it from its seat; shifting the key will permit the plug to be rotated by the shaft to open the valve, and the interengagement established by the key will enable return of the plug to orient it for closure.

8 Claims, 10 Drawing Figures

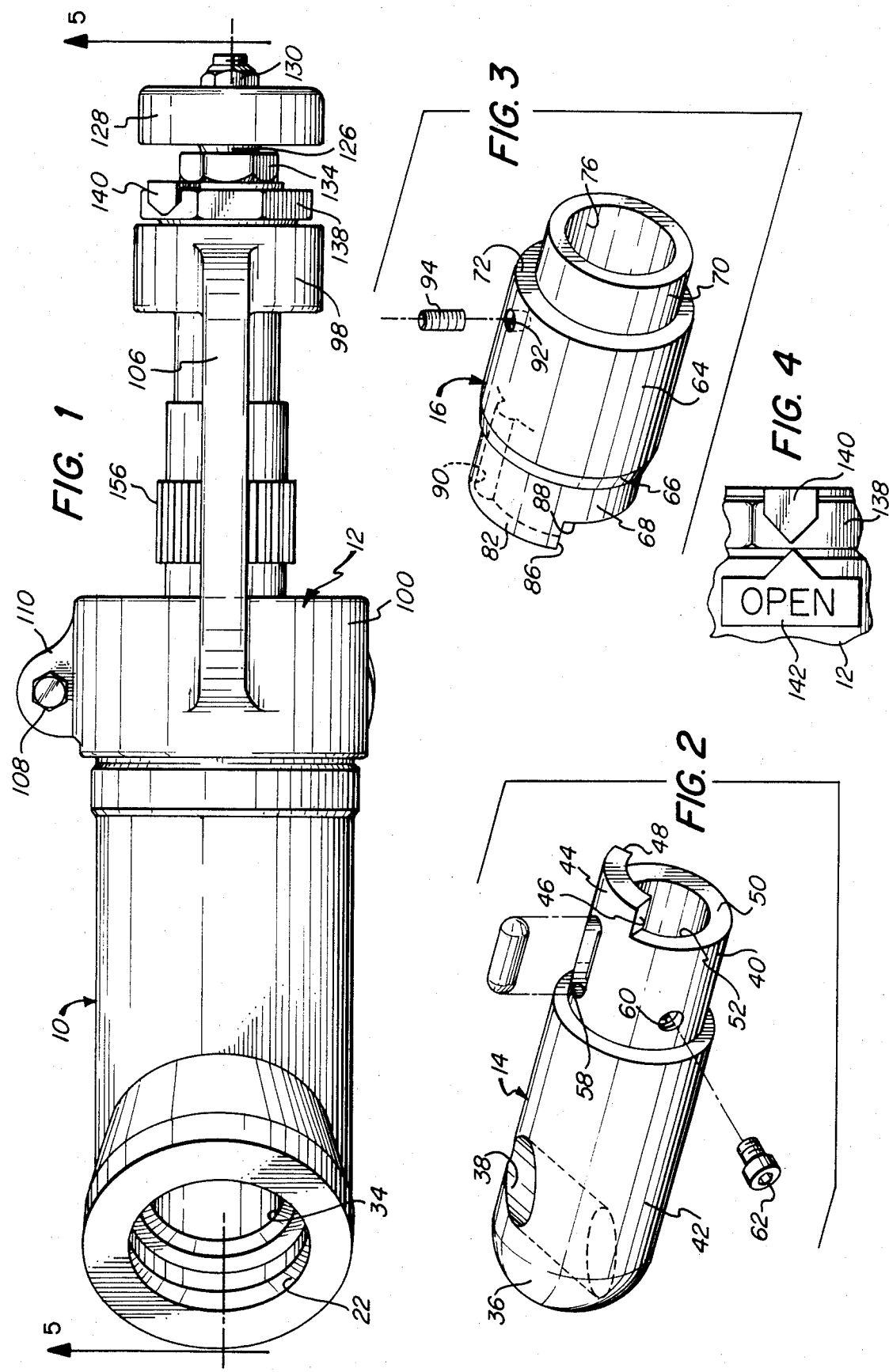

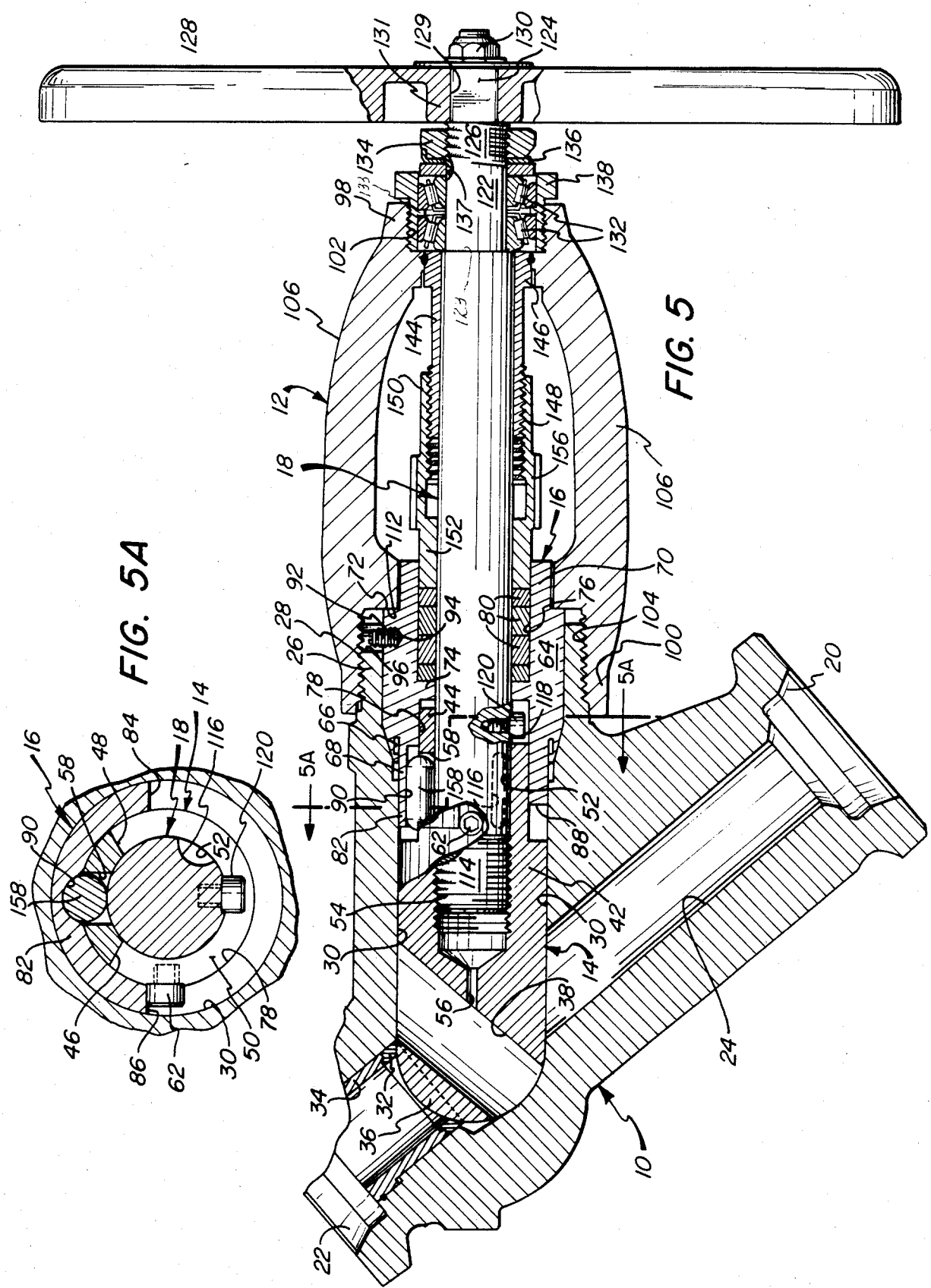

HALF-TURN VALVE

BACKGROUND OF THE INVENTION

Valves which operate by rotation of a plug member are highly effective, and are of course widely used for many applications. Wear of relatively moving parts is however a matter of substantial concern in such devices, and may be particularly problematic when the application creates high-pressure loads upon the plug.

Wear reduction and improved facility of operation have been afforded in valves of this type by providing means for displacing the plug away from its seat before rotation is initiated. Valves having such a feature are disclosed in various forms in the art, exemplary of which are the following U.S. Pat. Nos. 2,125,810 to Reed; 2,289,722 and 2,412,529 to Mueller et al; 2,459,682 to Carrie; 2,562,003 to Tratzik; 2,706,997 to Moody (showing a threaded interengagement of the stem with the plug); 2,707,613 to Wheatley; 2,708,094 to Heinen (employs plates which move radially to effect sealing, and locking rollers having two working positions); 2,711,302 to McWhorter (provides escaping pins that move into and out of arcuate tracks and indentations); and 2,988,319 and 4,073,468 to Erwin. Axial displacement is imparted to the valve plug of German patent No. 714,994 by use of bearing elements, and Lew et al disclose, in Australian specification No. 13980/83 (priority for which is based upon U.S. Pat. Ser. No. 372,462, filed Apr. 28, 1982), numerous embodiments of plug valves in which cylindrical ball plugs are used having a hemispherical end and a bore extending at an oblique angle therethrough. In certain instances (see FIG. 4) the valve of Lew et al is constructed so that the plug is lifted away from its seating surface prior to turning, and in the form shown in FIG. 21 a secondary plug, threadably engaged upon the end of an auxiliary stem, is used for flow throttling. In Lew et al U.S. Pat. No. 4,498,371 a direct-acting rotary actuator cylinder is described for use with the type of ball plug valves described, and a commercially available plug-type valve, called the "General Twin Seal Valve", includes mechanical means for freeing the plug before it is rotated from the closed to the open position.

Despite the prior art activity indicated by the foregoing, a need remains for a valve that is adapted for high pressure applications, which has a rotatable plug that is displaced from its seat prior to opening, and which is highly effective and reliable, durable, and relatively facile and economical to manufacture.

Accordingly, it is the broad object of the present invention to provide a novel plug valve which is capable of operation under high pressure conditions, and which is highly effective and reliable, durable, and relatively facile and economical to manufacture.

It is a more specific object of the invention to provide a novel half-turn valve in which the plug is tightly seated in the fully closed position, and in which the stem is turned to displace the plug from its seat and to thereafter rotate it to open the valve.

A further and even more specific object is to provide such a valve assembly wherein a unique mechanism is employed to afford highly reliable and facile operation.

SUMMARY OF THE INVENTION

It has now been found that the foregoing and related objects of the invention are attained by the provision of a valve assembly, which includes a valve body having a flow passage therethrough and a plug chamber therein. The plug chamber intersects the flow passage and defines passage portions opening into the chamber through ports spaced thereabout, and the chamber communicates with the exterior of the body through a bonnet opening which extends along an axis displaced from that of the flow passage.

A valve plug is snugly seated in the plug chamber, and sealingly engages at least one of the ports in a first position thereof to close the passage and prevent flow through the valve. The plug and chamber are dimensioned and configured to permit axial displacement of the plug, as well as rotation thereof about the axis of the bonnet opening. A transverse bore through the plug is dimensioned and configured to establish flow communication between the spaced ports in a second, angularly displaced position of the plug, to thereby open the valve. The plug has an outwardly extending stop element thereon, and it has an internal, threaded portion and a cylindrical collar portion extending therebeyond, both portions being aligned on the axis of the bonnet opening. Means is provided on the plug collar portion to define an arcuate, circumferentially extending path and an axially extending abutment surface element at least at one end thereof. The abutment surface element is disposed for contact by a stop element moved therealong, and the collar portion has an opening therethrough spaced from the path.

Within the bonnet opening of the valve body is affixed a bonnet, through which extends an axial bore of circular cross section; the collar portion of the plug is received within the bore, and is telescopically engaged by an inner end portion of the bonnet. The latter has a groove therein which is disposed axially along the bore, and it has means defining an arcuate path which extends circumferentially thereon and provides a pair of abutment surface elements spaced to the opposite sides of the groove, both surface elements being accessible for contact by a stop element moved along the arcuate path therebetween. The stop element of the valve plug is disposed to move along the arcuate path of the bonnet inner end portion, and to alternatively engage one of the abutment surface elements thereof upon relative rotation of the plug.

The stem of the valve, which is of circular cross section, extends through the bore of the bonnet and has a threaded end portion which engages the threaded portion of the valve plug. A recess is formed into the surface of the stem adjacent the threaded end portion, and a stop element extends outwardly from the stem and is disposed to move along the arcuate path of the plug collar portion into engagement with the abutment surface element thereof, upon relative rotation. The assembly also includes means for mounting the stem in a fixed axial position with respect to the valve body, and a locking element. The latter is trapped within the opening of the plug collar portion between the bonnet and stem, and is capable of radial movement to alternatively engage either the groove of the bonnet inner end portion or the recess of the stem.

The groove, opening, recess, stop elements and abutment surfaces of the assembly are so disposed with respect to one another that, in the "first" position of the plug the locking element lies within the opening and groove to thereby interengage the plug and bonnet, the element being held in place by a full diameter surface portion of the stem. In that relationship, the stop element of the stem is spaced from the abutment surface element of the plug collar portion, and the stop element of the plug lies adjacent one of the abutment surface elements of the bonnet inner end portion. In the "second" plug position the locking element lies within the opening and the recess, thereby interengaging the plug and stem, and is held in place by a full inside diameter portion of the wall of the bonnet inner end portion. The stop element of the stem then lies adjacent the abutment surface element of the plug collar portion, and the stop element of the plug lies adjacent the other of the two abutment surface elements on the bonnet end portion.

Rotation of the stem in one direction, from the "first" position thereof, will cause its threaded end portion to displace the plug axially from the "one" port of the valve body, bringing the stem to an intermediate position of rotation at which the recess thereof is presented to the locking element and the stop element thereof bears upon the abutment surface element of the plug collar portion. Further rotation of the stem will cause the locking element to shift within the opening of the plug collar portion so as to disengage the groove of the bonnet and engage within the recess of the stem, thereby permitting rotation of the plug to its "second" position and establishing flow communication between the passage portions of the valve body. Rotation of the stem in the opposite direction will effect the return of the plug to its "first" position, with the stop element of the plug being brought from its extreme position against one of the bonnet portion surface elements to a position abutting the other, to thereby restrain movement therebeyond.

Generally, the assembly will comprise a half-turn valve, with the angular spacing between the ports of the valve body, between the abutment surface elements of the inner end portion of the bonnet, between the opposite ends of the plug bore, and between the first and second plug positions being about 180° in each instance. In the preferred embodiments, the plug will be of generally cylindrical configuration with a generally hemispherical inner end portion, and the transverse bore will be rectilinear and obliquely disposed with respect to the longitudinal axis of the plug, the opposite ends thereof opening on the cylindrical portion and the hemispherical portion, respectively. In those embodiments the stop element of the stem will be angularly displaced from the abutment surface element of the plug collar portion by about 120°, and the plug bore and the valve body passage will extend on axes that are oriented at approximately 90° to one another, in the "first" plug position; in addition, the stop element and recess of the stem and the abutment surface element and opening of the plug collar portion will have an angular spacing of about 45° therebetween. The means defining the axially extending abutment surface elements and the arcuate paths of both the plug collar portion and also the bonnet inner end portion will advantageously comprise axially indented segments, and the recess of the stem, as well as the opening of the plug collar portion, will most desirably be elongated and longitudinally disposed thereon, with the locking element employed being of generally cylindrical configuration.

BRIEF DESCRIPTION OF THE DRAWINGS

FIG. 1 is an elevational view showing the valve of the invention;

FIG. 2 is a perspective view of the plug and locking cylinder employed in the valve of FIG. 1, showing the stop screw removed from the plug;

FIG. 3 is a perspective view of the bonnet of the valve, showing a screw element removed therefrom;

FIG. 4 is a fragmentary elevational view of a section at the top (right-hand end, as shown in FIG. 1) of the valve, drawn to an enlarged scale and depicting position-indicating elements provided thereon;

FIG. 5 is a view of the valve taken essentially along line 5—5 of FIG. 1, showing the plug in fully closed position;

FIG. 5A is a fragmentary cross-sectional view of the valve taken generally along line 5A—5A of FIG. 5, with portions removed for clarity of illustration;

DETAILED DESCRIPTION OF THE ILLUSTRATED EMBODIMENT

Figure 6:
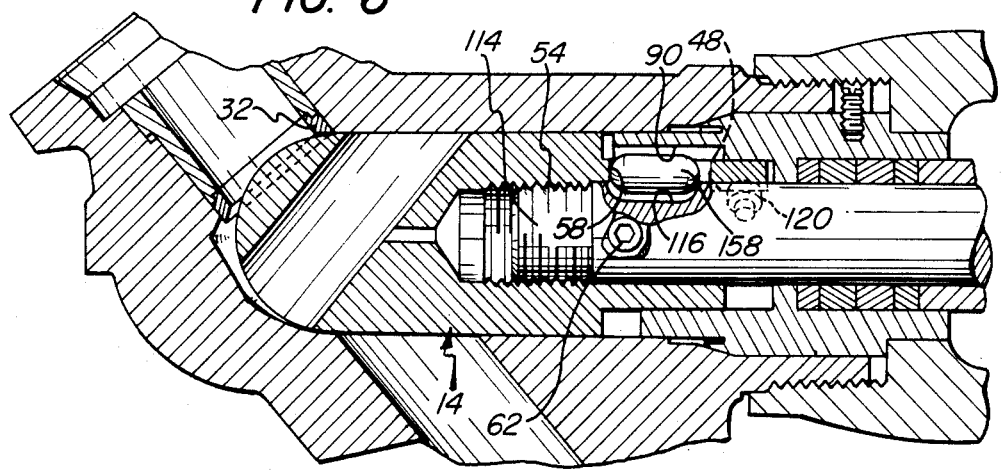
FIG. 6 is a fragmentary view similar to that of FIG. 5, illustrating only the lower portion of the valve and showing the stem rotated to an intermediate position to elevate the plug from its seat.

Turning now in detail to the appended drawings, therein illustrated is a valve assembly embodying the present invention, including a valve body generally designated by the numeral 10, a clamp yoke generally designated by the numeral 12, a plug generally designated by the numeral 14, a bonnet generally designated by the numeral 16, and a valve stem generally designated by the numeral 18. The valve body 10 has end ports 20,22 joined by a through flow passage 24, and a bonnet extension portion 26, which is disposed at an angle (of about 45°) to the flow passage 24 and is externally threaded at 28. A valve chamber 30 is formed through the extension portion 26 and intersects the passage 24, and an annular valve seat ring 32 is secured within the passage 24, at one side of the chamber 30; it is supported by a cylindrical insert 34, which may be welded in place.

The valve plug 14 is of generally cylindrical configuration, and has a hemispherical inner end portion 36 through which extends, at an angle of about 45° to the longitudinal axis of the plug, a transverse passageway 38. A cylindrical collar portion 40 extends axially from the opposite end of the body portion 42, and has an arcuate segment 44 thereon; the segment 44 in turn has a pair of axial surface elements or shoulders 46,48 defined on its opposite sides, which are connected by the arcuate surface element 50 provided by the circumferentially extending edge of the indented part of the collar portion. A bore 52 extends axially inwardly through the collar portion 40 and into the body portion 42, which is internally threaded at 54, and the bore is in flow communication with the passageway 38 through the small connecting conduit 56, for pressure relief. A slot 58 is formed through the collar portion 40 of the plug 14 and extends longitudinally between the shoulders 46,48. Also provided therein, at a location spaced 90° from the axis of the slot 58, is a threaded aperture 60, in which is engaged a small socket head screw 62.

The bonnet 16 has a cylindrical central body portion 64 which tapers, through a conical transition section 66, to an inner collar portion 68; a reduced diameter outer collar portion 70 extends from the opposite end of the body portion 64, between which is formed an annular shoulder 72. The bonnet is seated within the bonnet extension 26, with its upper collar portion 70 protruding outwardly therefrom, and the valve body bore 30 is enlarged and correspondingly tapered in that area to accommodate it. An outer chamber 76 is formed into the bonnet, within which is seated a set of annular packing rings 80, and it has an inner bore section 78, separated therefrom by an annular rib 74, which receives therewithin the collar portion 40 of the plug 14, the latter being telescopically engaged by the inner collar portion 68 of the bonnet. An arcuate segment 82 extends from the inner bonnet collar portion 68, and has a pair of axial surface elements or shoulders 84,86 defined on its opposite sides with an arcuate surface element 88 extending circumferentially therebetween. A groove 90 extends longitudinally inwardly from the edge of the collar portion 68, between the shoulders 84,86, and a threaded opening 92 is formed into the outer surface of the central portion 64 of the bonnet, in which is engaged a set screw 94; the latter is in turn seated within an opening 96 in the bonnet extension 26 to fix the bonnet to the valve body.

The clamp yoke 12 consists of upper and lower portions 98,100, internally threaded at 102 and 104, respectively, and joined to one another by axially extending arms 106. The lower portion 100 of the yoke is of split construction, and has a bolt 108 inserted through a pair of lugs 110 (only one of which is visible in FIG. 1) and tightened therewithin to firmly clamp the yoke 12 to the valve body 10. An annular shoulder 112 is formed at the inner end of the threaded section 104, upon which the annular shoulder 72 of the bonnet 16 abuts to secure the latter firmly in position within the extension 26 of the body 10.

The inner end portion of the valve stem 18 is threaded at 114, and is engaged within the internally threaded section 54 of the plug 14. An elongated semicircular recess 116 extends axially in the surface of the stem adjacent the threaded end portion 114, and a socket head screw 120 is engaged within a threaded aperture 118, which is provided near the recess 116. It should be noted that the angular distance between the screw 120 and the recess 116 (about 45°) is substantially the same as that between the opening 58 and the axial surface element 48 on the plug segment 44, for reasons that will become evident.

The opposite end of the stem 18 has a reduced diameter portion 122, which is threaded at 126, and a squared-off portion 124 outwardly thereof. A bar-like handle 128 has a square opening 129 formed through its hub portion 131, in which the correspondingly shaped portion 124 of the stem is engaged, and the handle 128 is held in place thereon by a nut 130 (the tip of the stem having a threaded section, which is not visible, for that purpose). An assembly of roller bearings 132, affixed within an externally threaded retainer 138, is secured upon the reduced-diameter stem section 122 by a locknut 134 and a lock-washer 136, the nut 134 being engaged upon the section 126 and the washer 136 having a finger element engaged within the small recess 137 of the stem; the retaining nut 138 is in turn threaded into the section 102 of the upper portion 98 of the yoke 12. The nut 134 acts upon the inner race of adjacent bearing 132 to force its outer race against the circumferential rib 133 of the retainer 138, which in turn acts through the outer race of the other bearing to force its inner race against the stem shoulder 123. In this way the two bearings are preloaded, and serve to resist the thrust generated by the action of the threaded end portion 114 of the stem. As seen in FIG. 4, a pointer element 140 is provided on the lock washer 136 and cooperates with the plate 142, which is affixed to the yoke 12, to indicate the open position of the valve plug.

An elongated bushing 144 extends axially through the yoke 12 and has an upper end portion 146 welded within the upper portion 98 thereof, against which the innermost roller bearing 132 is disposed. The bushing 144 extends along the stem 18, and has a threaded lower end portion 148, upon which is engaged a packing gland 152, which is internally threaded at 150. The lower end of the gland bears upon the packing rings 80, so that adjustment of the position of the gland 152 on the bushing 144 will compress the rings and thereby produce an effective seal against the valve stem 18, in conventional manner. For this purpose, the central section 154 of the gland has a set of axially extending splines or teeth, enabling convenient turning of the gland with a suitable captive wrench (not illustrated), as shown in U.S. Letters Pat. No. 4,351,512 to Chester A. Siver.

In FIGS. 1, 5 and 5A, the valve is depicted in its closed position; thus, the spherical portion 36 of the plug 14 is seated tightly upon the annular ring 32, thereby closing the passage 24 through the valve body 10. In that position, the plug 14 and bonnet 16 are locked to one another against relative rotation by the cylindrical locking key 158, which is engaged within both the opening 58 of the plug collar portion 40 and also the groove 90 of the bushing collar portion 68, and is held therein by the full diameter portion of the stem 18.

Figure 6A:
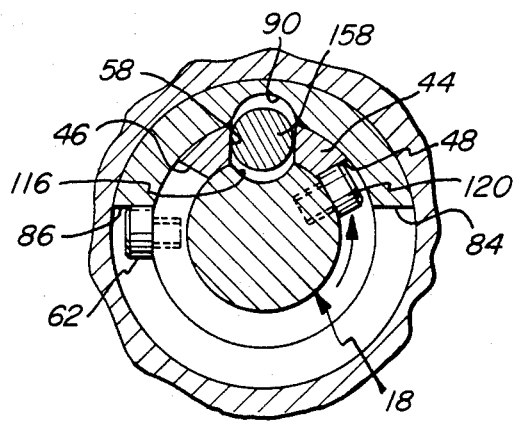
FIG. 6A is a fragmentary cross-sectional view similar to FIG. 5A, with the parts in the relationship of FIG. 6.
Figure 7A:
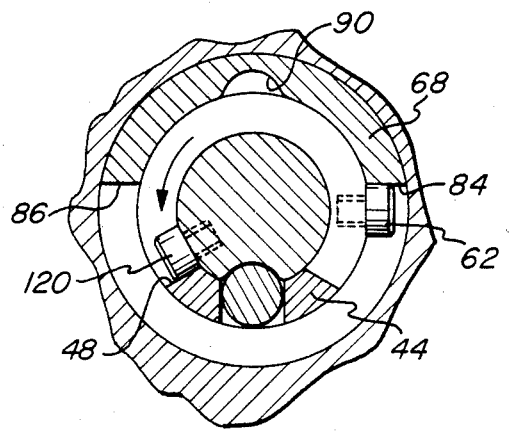
FIG. 7A is another fragmentary cross-sectional view similar to FIG. 5A, with the parts in the relationship of FIG. 7.
Figure 7:
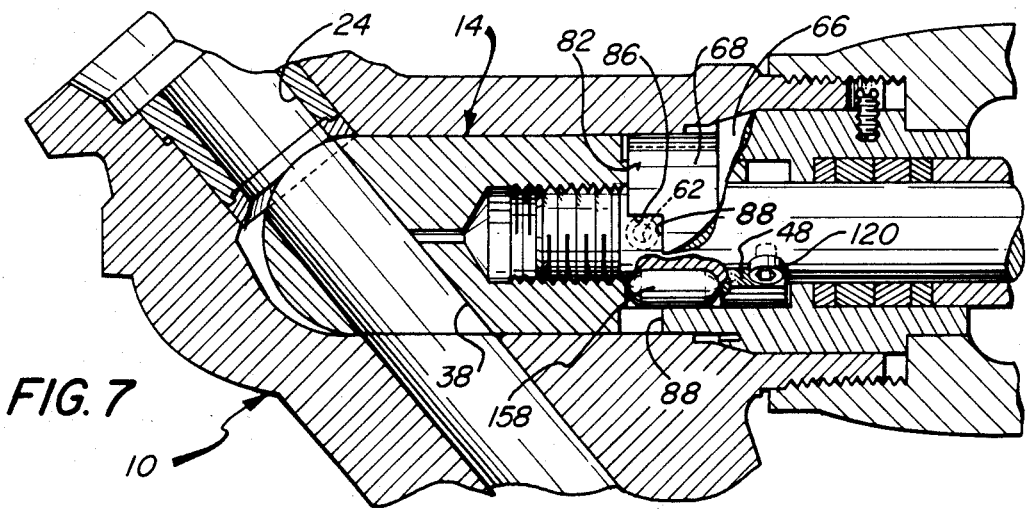
FIG. 7 is another fragmentary view similar to FIG. 5, showing the stem and plug rotated to the fully open position of the valve.

Because the plug is thus fixed against rotation, turning the handle 128 (normally in the counter-clockwise direction) will withdraw it from the seating ring 32, due to the jacking effect of the threaded end portion 114 of the stem coacting with the internally threaded plug section 54. This will eventually bring the elements of the valve to the relative positions shown in FIGS. 6 and 6A, with the stop screw 120 in contact with the axial shoulder 48 of the plug collar extension 44 and with the recess 116 of the stem 18 aligned with the opening 58 thereof. Further rotation of the stem will cause the screw 120 to exert force upon the plug 14, in turn effecting transfer of the cylindrical key 158 from the bonnet groove 90 into the recess 116, thereby disengaging the plug from the bonnet and coupling it (through the key as well as the stop screw) to the stem 18. In this condition the assembly can be brought to the open value position, shown in FIGS. 7 and 7A, in which the plug bore 38 is fully aligned with the through passage 24 of the body 10; further movement of the plug is prevented by abutment of the screw 62 upon the other shoulder 84 of the bonnet.

As will be appreciated, closing of the valve is effected simply by turning the handle 128 in the opposite direction, the locking key 158 (held within the recess 116 of the stem 18 by the full diameter inside surface 78 of the bonnet) establishing the interengagement necessary to simultaneously rotate the plug 14. After the parts are again brought to the relative positions shown in FIGS. 6 and 6A, the cylindrical key 158 can be shifted (by continued rotation of the stem) from the recess 116 into the groove 90 of the bonnet, so that the lower end portion 114 of the stem can eventually urge the plug 14 into tight sealing engagement upon the ring 32 by interaction of their threaded portions, with the stop screw 62 ultimately abutting the shoulder 86 (as depicted in FIG. 5A) and thereby preventing further rotation.

Thus, it can be seen that the present invention provides a novel plug valve which is capable of operation under high pressure conditions, and which is highly effective and reliable, durable, and relatively facile and economical to manufacture. More specifically, a novel half-turn valve is provided in which the plug is tightly seated in the fully closed position, and is displaced from the seat and subsequently rotated by turning of the stem in a single continuous action.

Having thus described the invention, what is claimed is:

1. In a valve assembly, the combination comprising:
   (a) a valve body having a flow passage therethrough and a plug chamber therein, said plug chamber intersecting said flow passage and defining passage portions opening into said chamber through ports space thereabout, said chamber communicating with the exterior of said body through a bonnet opening extending along an axis displaced from that of said flow passage;
   (b) a valve plug snugly seated in said plug chamber of said body and sealingly engaging at least one of said ports in a first position thereof to close said passage and prevent flow therethrough, said plug and chamber being dimensioned and configured to permit rotation of said plug about said axis from said first position to a second position and displacement thereof along said axis, said plug having a transverse bore therethrough dimensioned and configured to establish flow communication between said spaced ports in said second position, and having a threaded portion therewithin and a cylindrical collar portion outwardly of said threaded portion with both said threaded and collar portions being aligned on said axis, said collar portion having means defining an arcuate path extending circumferentially thereon with an axially extending abutment surface element at least at one end thereof and accessible for contact by a stop element moved along said arcuate path, and having an opening therethrough spaced circumferentially from said arcuate path, said plug having a stop element extending outwardly therefrom;
   (c) a bonnet affixed within said bonnet opening of said valve body and having a bore of circular cross section aligned on said axis thereof, said collar portion of said plug being received within said bore and telescopically engaged by an inner end portion of said bonnet, said inner end portion having a groove formed therein and extending axially along said bore, and having means defining an arcuate path extending circumferentially thereon and providing a pair of abutment surface elements spaced to the opposite sides of said groove and accessible for alternative contact by a stop element moved along said arcuate path therebetween, said stop element of said valve plug being disposed to move along said arcuate path and to alternatively engage one of said abutment surface elements of said bonnet upon relative rotation of said plug;
   (d) a valve stem of circular cross section extending through said bore of said bonnet and having a threaded end portion engaging said threaded portion of said valve plug, said stem having a recess formed into its surface adjacent said end portion and having a stop element extending outwardly therefrom and disposed to move along said arcuate path of said plug collar portion and to engage said abutment surface element thereof upon relative rotation therebetween;
   (e) means mounting said stem in a fixed axial position with respect to said valve body; and
   (f) a locking element trapped within said opening of said plug collar portion between said bonnet and stem for radial movement and dimensioned and configured to alternatively engage within said groove of said bonnet inner end portion and within said recess of said stem; said groove, opening, recess, stop elements and abutment surfaces being so disposed with respect to one another that, in said first position of said plug, said locking element lies within said opening and groove to interengage said plug and bonnet and is held in place by a full diameter surface portion of said stem, said stop element of said stem is spaced from said abutment surface element of said plug collar portion, and said stop element of said plug lies adjacent one of said abutment surface elements of said bonnet inner end portion; and so that, in said second position of said plug, said locking element lies within said opening and said recess to interengage said plug and stem and is held in place by a full inside diameter portion of the wall of said bonnet inner end portion, said stop element of said stem lies adjacent said abutment surface element of said plug collar portion, and said stop element of said plug lies adjacent the other of said abutment surface elements of said bonnet end portion; whereby rotation of said stem in one direction from said first position thereof will cause said threaded end portion thereof to lift said plug from said one port of said valve body, will present said recess thereof to said locking element, and will cause said stop element thereof to bear upon said abutment surface element of said plug collar portion, whereby further rotation of said stem will cause said locking element to move within said opening of said plug collar portion to disengage from said groove of said bonnet and to engage within said recess of said stem to thereby couple said plug and stem for conjoint rotation, and will thereby enable rotation of said plug to said second position thereof to align said transverse bore with said ports of said valve body to establish flow communication between said passage portions, with said stop element of said plug abutting one of said abutment surface elements of said bonnet end portion to restrain further movement of said plug therebeyond, and whereby rotation of said stem in the opposite direction from said second position will enable return of said plug to said first position with said stop element thereof abutting the other of said bonnet portion surface elements to restrain further movement of said plug therebeyond.

2. The assembly of claim 1 wherein said ports of said valve body, said abutment surface elements of said inner end portion of said bonnet, the opposite ends of said plug bore and said first and second plug positions are, in each instance, angularly spaced 180° from one another, said assembly being a half-turn valve.

3. The assembly of claim 2 wherein said plug is of generally cylindrical configuration with a generally hemispherical inner end portion, and wherein said transverse bore is rectilinear and is obliquely disposed with respect to the longitudinal axis of said plug, one end of said bore opening on the cylindrical portion of said plug and the other end opening on the hemispherical portion thereof.

4. The assembly of claim 2 wherein in said first position of said plug said stop element of said stem is angularly displaced from said abutment surface element of said plug collar portion by about 120°.

5. The assembly of claim 4 wherein said stop element and recess of said stem, and said abutment surface element and opening of said plug collar portion are, in both instances, angularly spaced about 45° from one another.

6. The assembly of claim 3 wherein said plug bore and said valve body passage extend on axes that are oriented at approximately 90° to one another in said first plug position.

7. The assembly of claim 1 wherein said means defining said axially extending abutment surface elements and said arcuate paths, of both said plug collar portion and also said bonnet inner end portion, comprises an axially indented segment thereof.

8. The assembly of claim 1 wherein both said recess of said stem and said opening of said plug collar portion are elongated and extend longitudinally thereof, and wherein said locking element is of generally cylindrical configuration.

* * * * *